United States Patent Office 3,078,978
Patented Feb. 26, 1963

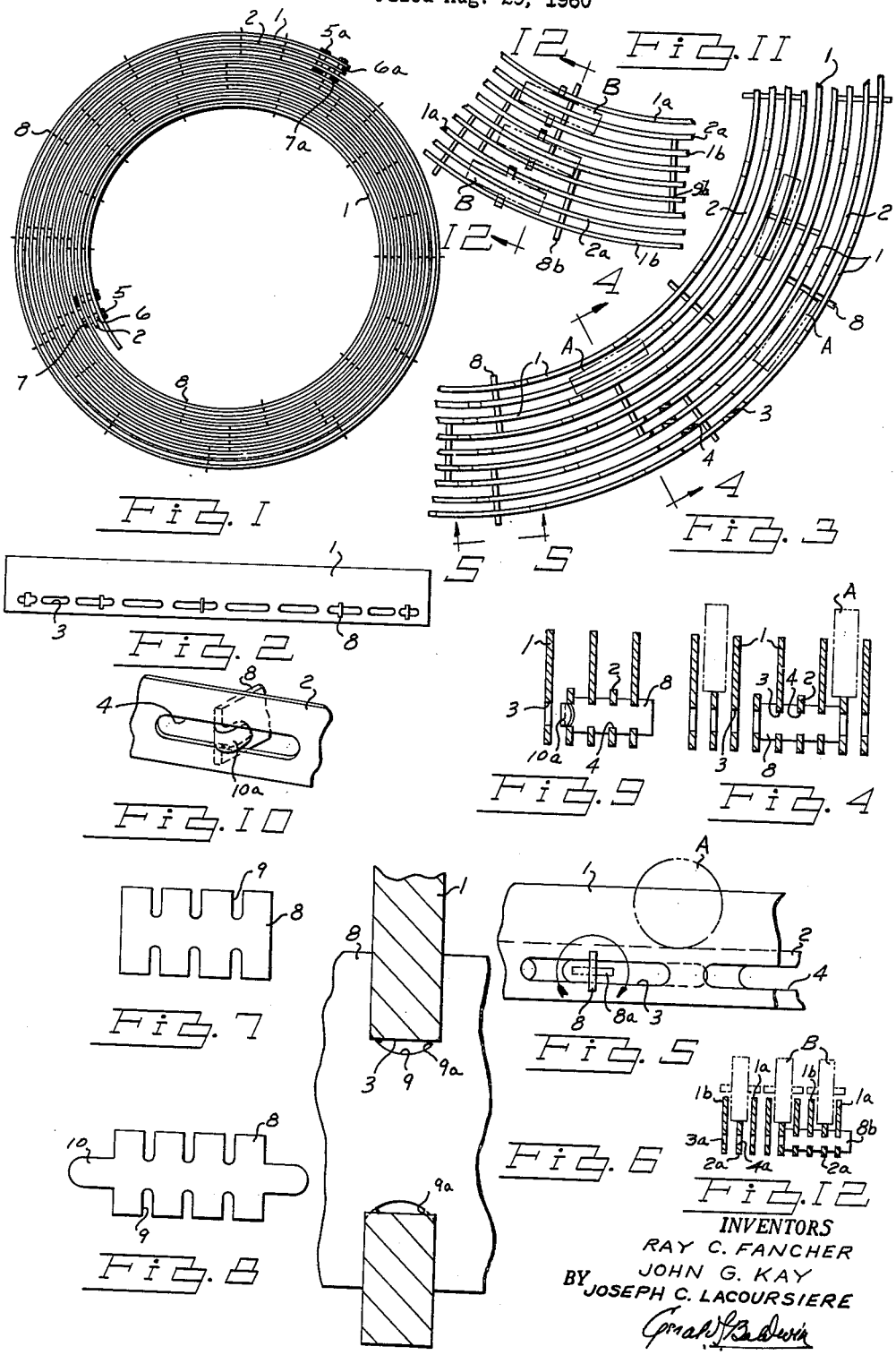

3,078,978
STORAGE UNITS
Ray C. Fancher and John G. Kay, Detroit, and Joseph C. Lacoursiere, Roseville, Mich., assignors to F. Jos. Lamb Company, Detroit, Mich., a corporation of Michigan
Filed Aug. 29, 1960, Ser. No. 52,610
4 Claims. (Cl. 193—38)

This invention relates to improvements in storage units, and refers primarily to such units which form part of automated installations for the storage and transfer of workpieces from one machine to another for the performance of consecutive operations thereon, but does not refer to the means employed for moving workpieces along the storage units which may be done in any preferred manner. Such units frequently include a spirally wound horizontal guide rail the coils or turns of which are uniformly spaced from one another throughout their length; and spaced between the adjacent coils or turns of the guide rail throughout its length are corresponding coils or turns of a similarly wound carrier rail along which workpieces are adapted to travel between adjacent turns of the guide rail. The spacing, or pitch, of the coils must be such that opposed portions of the guide rail between which workpieces travel are only slightly farther apart than the width of the workpieces to prevent their undue lateral movement.

At the present time it is customary in such structures to provide a central support extending from which are radial arms having uniformly spaced vertical slots therein in which the lower extremities of the rails are inserted as they are coiled. The rails are then tack welded in the slots. Not only is this a relatively expensive construction, but once the rails have been welded in the slots it is not feasible to remove them subsequently and then re-coil them at a different spacing, or pitch, to form a unit for handling workpieces of a different width.

It is an object of the invention to provide a storage unit comprising a spirally wound guide rail spaced between adjacent coils or turns of which is a correspondingly wound carrier rail, and wherein clips, which are readily insertable or removable, are employed at intervals intermediately of the length of the rails for holding adjacent coils in properly spaced relation, thereby cheapening and simplifying assembly and permitting disassembly of the unit so that the rails may then be re-wound at a different spacing or pitch from one another to accommodate workpieces of a different width, and held when so coiled by other clips. For while the latter are quite cheap, the rails, which are usually made of stainless or spring steel, are not.

Another object of the invention is to provide a storage unit including a spiral guide rail between adjacent coils or turns of which throughout its length a carrier rail is similarly wound; wherein longitudinal slots having their adjacent extremities relatively close together are formed through both the rails throughout their length; and wherein clips are inserted at intervals through and across opposed portions of the slots of a plurality of adjacent coils or turns of the rails for holding them in spaced relation.

A further object of the invention is to provide means for holding longitudinally slotted rail sections uniformly spaced by clips inserted at intervals through the slots in a plurality of the rail sections, each clip having parallel notches formed in its opposite sides and each notch in one side being in alignment with one notch in the opposite side, whereby each aligned pair of notches engages opposite sides of the upper and lower margins of one of the rail slots.

With these and other objects and advantages in view which will become apparent as the specification proceeds, the invention is hereinafter more fully described with the aid of the accompanying drawings, in which:

FIGURE 1 is a plain view of the invention,
FIGURE 2 is a side view thereof, and
FIGURE 3 is an enlarged partial plan view.
FIGURE 4 is a section on the line 4—4 of FIGURE 3.
FIGURE 5 is a side view on the line 5—5 of FIGURE 3.
FIGURE 6 is a further enlarged sectional view showing a slotted portion of a rail in engagement with aligned notches in a clip.
FIGURE 7 is a plan view of a clip.
FIGURE 8 is a plan view of a modified form of clip.
FIGURE 9 is a sectional view showing a plurality of rail sections held in spaced relation by another modified form of clip.
FIGURE 10 is a perspective view of FIGURE 9.
FIGURE 11 is a partial plan view showing a modified form of the invention, and
FIGURE 12 is a section on the line 12—12 of FIGURE 11.

Referring to the drawing, 1 designates a spirally wound horizontal guide rail centrally spaced between adjacent turns or coils of which throughout its length is a correspondingly wound horizontal carrier rail 2. Both the rails 1 and 2 are flat in cross section. The upper margin of the carrier rail is spaced a uniform distance beneath the upper margin of the guide rail throughout its length. Thus each adjacent pair of coils or turns of the guide rail 1 constitute opposite sides of spirally wound chuting between which workpieces A are adapted to travel along the carrier rail. Formed through each of the rails 1 and 2 and extending intermittently throughout their length are longitudinal slots 3 and 4, respectively, the adjacent extremities of which are relatively close together. The inner extremities of the coiled rails 1 and 2 are held in spaced relation by bolts 5 which extend through opposed pairs of slots 3 in the two inner coils of the guide rail 1 and through slots 4 in the inner coil between them of the carrier rail 2. Spacers 6 mounted on the bolts 5 between opposed portions of the rails 1 and 2 retain the latter properly spaced when nuts 7 on the bolts are tightened.

The rails are then coiled spirally and secured at intervals intermediately of their length in proper spaced relation by clips 8, which are more fully described hereafter, until the storage unit has been built up to the required size. The arrangement for holding the outer extremities of the rails in spaced relation is the same as that employed at their inner extremities and includes bolts 5a which extend through opposed slots 3 in the two outermost coils of the guide rail 1 and through slots 4 in the portions of the carrier rail 2 between them, and spacers 6a and nuts 7a on the bolts 5a. Workpieces A are usually delivered onto the outer extremity of the carrier rail 2 between the two outermost coils of the guide rail 1 by any suitable means not shown, and are discharged from the unit at its inner extremity where the end of the guide rail 1 projects somewhat beyond the inner end of the carrier rail thereby forming a guideway between the end of the guide rail and the coil thereof next thereto through which workpieces are adapted to drop onto a conveyor or other means for transferring them to their intended destination.

The clips 8 are flat and thinner than the width of the slots 3 and 4. In each of two opposite sides of each clip a uniformly spaced row of parallel notches 9 is formed so that each notch in one row is in alignment with one notch in the opposite row. Moreover the spacing between the notches in each row is the same as that between adjacent coils of the rails 1 and 2; and again, the distance between the outer notches 9 and the adjacent ends of the clips is the same as the spacing between adjacent rails.

The clips are held parallel with the slots 3 and 4, as shown at 8a, while bieng inserted into position. When each aligned pair of notches is in alignment with the upper and lower margins of one of the slots 3 or 4, the clip is turned through 90 degrees by an appropriate tool. It is of course understood that the width of the notches is such as to firmly engage opposite sides of the slot margins so that each notch then grips one side of one slot and secures the portions of the rails thus engaged in properly spaced relation. Moreover since the distance between the outer notches 9 and the adjacent ends of the clips 8 is the same as the spacing between the notches and between adjacent coils, the coil on each side nearest those actually gripped by the clips is braced thereby against inward movement.

It will also be noted in FIGURE 6 that while the edges of the slots 3 and 4 are rectangular in section the inner extremities of the notches 8 are slightly rounded so that as the clips are turned into engagement with the slots the relatively hard metal of which the rails are made, usually stainless or spring steel, bites into the sides of the notches in the clips, which are made of softer material, and displaces some of it as indicated at 9a, thereby making a tight bond between the clips and the rails.

If the workpieces are quite heavy, or if a number of them are liable at times to travel relatively fast along the unit, vibration may sometimes occur and tend to loosen the grip of the clips on the rails. In such cases an outwardly projecting flexible tongue 10 is formed to extend from one or both ends of some of the clips. After these clips are in position the tongues are folded back as shown at 10a in FIGURES 9 and 10 to engage the sides of the slots and thereby lock the clips in position.

While the clips have been shown with three notches along each side for engagement with a similar number of rail portions it is of course understood that the clips may be provided with a greater or lesser number of notches to engage more or fewer rail sections if desired.

FIGURES 11 and 12 show a modified form of the invention wherein the unit consists of a spirally wound carrier rail 2a the coils or turns of which extend between two separate and similarly wound guide rails 1a and 1b. At each extremity the guide and carrier rails are held in spaced relation in the manner shown in FIGURE 1. The guide rails and the carrier rail are again provided with longitudinal slots 3a and 4a, respectively, and the clips 8b each extend through opposed portions of adjacent slots. In this case the clips are shown longer and are provided with a correspondingly greater number of notches 9b to engage a greater number of rail sections. The purpose of this construction is to provide a satisfactory narrow runway, between adjacent and opposed portions of the two guide rails 1a and 1b with a portion of the carrier rail between them, to accommodate and insure proper travel of workpieces B having bosses or axles projecting laterally therefrom, and to make the height of the guide rails such that the said bosses or axles project laterally over their upper margins. This construction then, while utilizing two guide rails instead of one, does not add to the width of runway needed for the passage of such workpieces but insures their remaining vertical at all times in the unit.

Moreover while in the foregoing the arrangement of the clips has been shown and described in connection with spirally wound rails it is found that this means of retaining rails in properly spaced relation is equally advantageous if the rails are curved, or for holding curved portions of rails in spaced relation.

What we claim is:

1. Means for holding a plurality of rails in spaced-apart relation, including a plurality of similarly shaped rails each having a plurality of elongate slots extending transversely therethrough, a series of clips spaced longitudinally along said rails and extending through opposed rail slots, each of said clips having opposed pairs of notches opening through opposite sides thereof, with the marginal edges of each pair of notches engaging the rail surfaces adjacent said slots, and a flexible tongue projecting from at least one extremity of said clips, said tongue being flexed into engagement with one of said rail slots to hold the rail immovable.

2. A storage unit including at least one spirally wound guide rail, a similarly wound carrier rail extending parallel with said guide rail, with the upper edge of the guide rail positioned above the carrier rail throughout its length, said rails having a plurality of elongate slots extending transversely therethrough, a series of clips extending through slots in opposed portions of the rails, each of said clips having a plurality of notches opening transversely through the opposite edges thereof, with the marginal edges of said notches engaging the rail surfaces adjacent said slots, and an integral tongue projecting from at least one extremity of said clips and adapted to be flexed into engagement with a slot in one of said rails to hold such rail immovable.

3. A clip for holding a plurality of rails having elongate slots therein in spaced-apart relation, comprising a flat strip of rigid material provided with a plurality of spaced-apart notches opening transversely through the marginal edge of said strip, with the distance between adjacent notches being equal to the spacing between adjacent rails, the edges of said notches adapted to overlie and grip opposed surfaces of said rails adjacent said slots, and an integral tongue projecting from at least one extremity of said strip and adapted to be flexed into engagement with one of said rails to hold the same in fixed relation to the remaining rail.

4. A clip for holding a plurality of rails having slots extending transversely therethrough in spaced-apart relation, comprising a flat strip of rigid material having opposed parallel edges, said strip provided with a plurality of opposed pairs of notches opening transversely through opposite edge portions of said strip, each pair of notches being spaced from adjacent pairs a distance equal to the spacing between said rails, with the marginal edges of said notches adapted to overlie and grip opposite surfaces of said rails adjacent said slots, and an integral tongue projecting from at least one extremity of said strip and adapted to be flexed into engagement with one of said rails to hold the same in fixed relation to the remaining rail.

References Cited in the file of this patent

UNITED STATES PATENTS

| | | |
|---|---|---|
| 2,712,200 | Dearling | July 5, 1955 |
| 2,770,072 | Bast | Nov. 13, 1956 |
| 2,815,841 | Dabich | Dec. 10, 1957 |
| 2,947,401 | Schuricht | Aug. 2, 1960 |

FOREIGN PATENTS

| | | |
|---|---|---|
| 207,086 | Germany | Feb. 19, 1909 |